United States Patent
Raffy et al.

(10) Patent No.: US 10,934,218 B2
(45) Date of Patent: Mar. 2, 2021

(54) POROUS CERAMIC PRODUCTS OF TITANIUM SUB-OXIDES

(71) Applicant: SAINT-GOBAIN CENTRE DE RECHERCHES ET D'ETUDES EUROPEEN, Courbevoie (FR)

(72) Inventors: Stéphane Raffy, Cavaillon (FR); Brice Aubert, Le Thor (FR); Daniel Urffer, Saint-Saturnin (FR); Samuel Marlin, Plan d'orgon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 16/471,152

(22) PCT Filed: Dec. 20, 2017

(86) PCT No.: PCT/FR2017/053745
§ 371 (c)(1),
(2) Date: Jun. 19, 2019

(87) PCT Pub. No.: WO2018/115749
PCT Pub. Date: Jun. 28, 2018

(65) Prior Publication Data
US 2019/0315661 A1   Oct. 17, 2019

(30) Foreign Application Priority Data
Dec. 20, 2016   (FR) ...................... 1662930

(51) Int. Cl.
*C04B 35/46* (2006.01)
*C04B 38/06* (2006.01)
*C04B 38/00* (2006.01)

(52) U.S. Cl.
CPC ............ *C04B 38/068* (2013.01); *C04B 35/46* (2013.01); *C04B 38/0054* (2013.01); *C04B 2235/3237* (2013.01); *C04B 2235/3251* (2013.01)

(58) Field of Classification Search
CPC . C04B 35/46; C04B 35/6265; C04B 38/0054; C04B 2235/3237;
(Continued)

(56) References Cited

U.S. PATENT DOCUMENTS 4,422,917 A    12/1983   Hayfield
4,931,213 A *   6/1990   Cass ...................... C04B 35/46
                                                       252/502

(Continued)

FOREIGN PATENT DOCUMENTS

EP          0 047 595 B1    3/1982
WO      WO 2014/049288      4/2014

OTHER PUBLICATIONS

International Search Report as issued in International Patent Application No. PCT/FR2017/053745, dated Apr. 17, 2018.
(Continued)

*Primary Examiner* — Noah S Wiese
(74) *Attorney, Agent, or Firm* — Pillsbury Winthrop Shaw Pittman LLP

(57) ABSTRACT

Method for manufacturing porous products consisting essentially of titanium suboxide(s) of general formula TiOx, the value of x being between 1.6 and 1.9, the method including a) mixing the raw materials including at least one source of titanium dioxide, a reducing agent comprising carbon, b) forming the product, c) optionally, in particular when organic products are used during step a), thermal treatment under air or an oxidizing atmosphere, d) sintering, for example at a temperature above 1150° C. but not
(Continued)

exceeding 1430° C., under a neutral or reducing atmosphere, in which the source of titanium dioxide consists of at least 55 wt % of anatase.

20 Claims, 1 Drawing Sheet

(58) Field of Classification Search
CPC .... C04B 2235/3251; C04B 2235/3232; C04B 2235/424; C04B 2235/5445
See application file for complete search history.

(56) References Cited

U.S. PATENT DOCUMENTS

| | | | | |
|---|---|---|---|---|
| 5,173,215 | A * | 12/1992 | Clarke | C04B 35/46 423/608 |
| 6,451,485 | B1 * | 9/2002 | James | H01G 4/08 429/232 |
| 10,490,316 | B2 * | 11/2019 | Naoi | H01M 4/0471 |
| 2006/0049060 | A1 | 3/2006 | Hori | |
| 2015/0251956 | A1 * | 9/2015 | Raffy | C01G 23/043 252/519.12 |

OTHER PUBLICATIONS

Office Action as issued in European Patent Application No. 17837975. 6, dated May 28, 2020.

Li, X., et al., "Investigation of fabrication of $Ti_4O_7$ by carbothermal reduction in argon atmosphere and vacuum," Journal of Materials Science. Materials in Electronics, vol. 27, No. 4, Dec. 2015, XP035646101, pp. 3683-3692.

Berer, L.-M., et al., "Spray Powders and Coatings on the Basis of Titanium Suboxides," Proceedings of the International Thermal Spray Conference, May 2001, XP008100320, pp. 291-300.

* cited by examiner

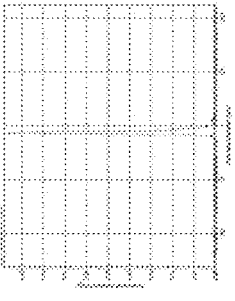

POROUS CERAMIC PRODUCTS OF TITANIUM SUB-OXIDES

CROSS-REFERENCE TO RELATED APPLICATIONS

This application is the U.S. National Stage of PCT/FR2017/053745, filed Dec. 20, 2017, which in turn claims priority to French patent application number 1662930 filed Dec. 20, 2016. The content of these applications are incorporated herein by reference in their entireties.

The invention relates to porous ceramic products consisting predominantly of titanium suboxides. Conventionally, "titanium suboxides" means titanium oxides of the general formula $TiO_x$ in which x is between 1 and 2, exclusive, in particular the so-called Magnéli phases. The invention also relates to a method of manufacturing these porous ceramic products, and uses thereof in particular for electrochemical devices, useful in particular for treating liquids, for example water purification.

Of course, because of the advantages that they provide, these products may be used advantageously in many other applications, in particular in any field requiring high and/or uniform and/or monomodal porosity. We may mention in particular, but without being restricted thereto, electrodes in electrochemical systems, conductive supports for layers or for membranes or for dispersed active phases or for the field of catalysis, in particular for oxidation of volatile organic compounds.

To improve the treatment of effluents laden with biorefractory pollutants (for example antibiotics, anti-inflammatories, etc.) that are not removed by conventional methods, the use of membrane systems is envisaged, which must have two functions: on the one hand, allow retention of the compounds to be treated and on the other hand ensure their electrochemical degradation. The product used in these membrane systems must therefore be of suitable porosity relative to the size of the polluting particles and allow the effluent being treated to pass through, while slowing it down, in order to prolong contact of the compounds to be degraded with the membrane, without generating an excessive head loss. It must also be electrically active, i.e. allow degradation (conversion of the organic carbon of the polluting compounds into nontoxic mineral carbon) by electrochemistry. The porous products based on titanium suboxides, in particular consisting of or comprising materials based on Magnéli phase $Ti_4O_7$, $Ti_5O_9$ or $Ti_6O_{11}$ and quite particularly based on $Ti_4O_7$ are envisaged for such an application according to the present invention.

Patent EP 047 595 B1 (or its equivalent U.S. Pat. No. 4,422,917) proposes materials consisting of suboxide of the $TiO_x$ type with x between 1.55 and 1.95, for making electrodes. The materials are synthesized starting from $TiO_2$ powder mixed with a reducing compound of the type Ti, TiN, TiSi, C, TiO or $Ti_2O_3$, at temperatures between 1150 and 1450° C. depending on the nature of the reducing compound.

International patent application WO2014/049288 relates to fused grains consisting essentially of a mixture of the Magnéli phases $Ti_5O_9$ and $Ti_6O_{11}$. It describes in particular a comparative example made from a mixture of rutile and 4 wt % of carbon black sintered at 1450° C. under argon for 2 hours and of general formula $TiO_{1.82}$. It describes another comparative example made from a mixture of anatase and 1 wt % of carbon black sintered at 1450° C. under argon for 2 hours, which has a general formula $TiO_{1.79}$ and is made up of the phases $Ti_4O_7$ (25% of the total weight of the product), $Ti_5O_9$ (30 wt %), $Ti_6O_{11}$ (20 wt %) and $Ti_3O_5$ (25 wt %). This application does not describe a porous product with a view to the filtration and/or electrochemical applications according to the invention.

The article "Electrochemical impedance spectroscopy study of membrane fouling and electrochemical regeneration at a sub-stoichiometric $TiO_2$ reactive electrochemical membrane" published in the Journal of Membrane Science, 510-523, (2016) describes the use of $Ti_4O_7$ and $Ti_6O_{11}$ membrane having a porosity of 28.2% with a median pore size of 3.27 μm as well as a bimodal pore distribution.

The article "Development and Characterization of Ultrafiltration $TiO_2$ Magnéli Phase Reactive Electrochemical Membranes" in the publication "Environ Science and Technologie", 50(3), p1428-36 (2016) describes porous products and in particular a porous electrochemical membrane used for ultrafiltration, with porosity of the order of 30% and median pore diameter of 2.99 micrometers. The method for obtaining such membranes involves several steps including treatment under hydrogen with an atmosphere at high temperature (1080° C.) for obtaining said Magnéli phases. Carrying out such a method thus seems dangerous.

All these methods lead finally to porous membranes of titanium oxide for which a proportion of the porosity is of nanometric size and therefore too small to be useful for the required function of filtration. Furthermore, this additional porosity contributes to reduction of the mechanical strength of the membrane.

The above analysis shows that there is still a need for a safe method for preparing these porous products based on titanium suboxides corresponding to a general formula $TiO_x$, in particular in which x is between 1.50 and 1.95 and quite particularly in which x is between 1.75 and 1.85.

Moreover, there is a need for ceramic products based on titanium suboxide(s) with increased porosity, i.e. whose useful open porosity (i.e. accessible for the compounds to be degraded) is greater than that described in the above publications.

The aim of the present invention is to provide an effective solution to such problems.

According to a first aspect, the present invention thus relates to a method for making porous products consisting essentially of titanium suboxide(s) of general formula TiOx, the value of x being between 1.6 and 1.9, said method comprising the following steps:

a) mixing the raw materials comprising at least one source of titanium dioxide, a reducing agent comprising carbon and optionally one or more organic product(s), for example binder, plasticizer, lubricant, preferably mixed with a solvent such as water, b) forming the product, for example by extrusion, pressing, tape casting or granulation, c) optionally, in particular when organic products are used during step a), thermal treatment under air or an oxidizing atmosphere, at a temperature sufficient to allow removal of a high proportion of the organic product or products, and below the evaporation temperature of the reducing agent, d) sintering, for example at a temperature above 1150° C. but not exceeding 1430° C., under a neutral or reducing atmosphere.

According to an essential feature of the method according to the invention, the source of titanium dioxide consists of at least 55% of the anatase form.

According to another essential feature of the method according to the invention, the amount of reducing agent and the sintering temperature are adjusted together in such a way that the final porous product corresponds to the general formula TiOx, the value of x being between 1.6 and 1.9, preferably between 1.75 and 1.85 and more particularly that the final porous product consists essentially of phases of the type $Ti_nO_{2n-1}$, n being an integer greater than or equal to 4 and less than or equal to 9, in particular among $Ti_4O_7$, $Ti_5O_9$, $Ti_6O_{11}$.

Owing to this triple selection in the choice of the source of titanium dioxide, the amount of the reducing agent and the final sintering temperature in the method described above, it proved possible not only to obtain a porous product directly and in complete safety, for which the nature of the phases present can easily be adjusted but which also has improved porosimetric characteristics, as is demonstrated in the rest of the description and in particular the examples. Thus, by adjusting the source of titanium dioxide, the process parameters and in particular the amount of reducing agent, the sintering temperature, and optionally the temperature and duration of the thermal treatment in step c), it becomes possible according to the invention to obtain advantageously a product whose composition is adjustable, in particular that mainly comprises Magnéli phases selected from $Ti_3O_5$, $Ti_4O_7$, $Ti_5O_9$, $Ti_6O_{11}$, $Ti_7O_{13}$, $Ti_8O_{15}$, $Ti_9O_{17}$ or a mixture comprising predominantly at least two of these phases, and whose porosity is greater than that obtained by the methods described previously, and in particular greater than or equal to 34%, and even more advantageously whose pore distribution is essentially monomodal.

According to preferred embodiments of the method:

The initial mixture comprises less than 40%, or less than 35%, or less than 30%, or less than 20%, or even less than 10%, of rutile as the source of titanium dioxide.

The initial mixture comprises more than 60 wt % of anatase as the source of titanium dioxide, and preferably more than 65%, or more than 70%, or more than 80%, preferably even more than 90% of anatase as the source of titanium dioxide, or even only comprises anatase as the source of titanium dioxide, apart from the inevitable impurities.

The anatase in the initial mixture is preferably in the form of powder with median diameter between 0.2 and 0.5 micrometers.

The reducing agent comprising carbon may be selected from carbon black, cokes, activated charcoals, graphite or any other organic compound comprising at least 50 wt % of carbon, or at least 70% or even 80 wt % of carbon. The reducing agent comprising carbon may also comprise, or even consist of titanium carbide (TiC).

The reducing agent is preferably in the form of powder with median diameter between 0.2 and 0.5 micrometers.

The initial mixture may advantageously comprise between 1.5 and 5.0 wt % of carbon, relative to the weight of titanium dioxide. Quite clearly, the carbon comes essentially or completely from said reducing agent.

Preferably, relative to the weight of titanium dioxide, the carbon content of the mixture is therefore above 1.5%, or above 2.0%, or even above 2.5%.

More preferably, relative to the weight of titanium dioxide, the carbon content of the mixture is below 4.5%, or even below 4.0 wt %.

According to a preferred embodiment of the invention, the median diameter of the grains of the powders of the initial mixture before the forming step is less than or equal to 1 micrometer, or even less than 0.5 micrometers.

Preferably the median diameter of the grains of the powders of the initial mixture before the forming step is between 0.1 and 1 micrometer and very preferably is between 0.2 and 0.5 micrometers.

The initial mixture may comprise carbon black as the reducing agent and more preferably the reducing agent is carbon black.

The initial mixture may comprise between 1.5 and 5.0 wt % of carbon black, relative to the weight of titanium dioxide. Preferably, the content of carbon black is above 1.5%, or above 2.0%, or above 2.5% and/or below 4.5%, or below 4.0 wt % of carbon black relative to the weight of titanium dioxide.

Titanium dioxide preferably represents more than 90% of the total mineral mass present in the initial mixture (apart from mineral carbon), and preferably represents the whole of the mineral mass present in the initial mixture.

While remaining within the scope of the invention, the initial mixture may, however, also comprise mineral material other than titanium dioxide, for example in an amount below 5.0%, or below 4.0%, or below 3.0%, or below 1.0%, or even below 0.5% of the total mineral mass.

This mineral material may for example be silica ($SiO_2$), oxides such as $Nb_2O_5$ or $Ta_2O_5$, $V_2O_5$, $ZrO_2$, oxides of Ba, Sr, Mn, Cr, Fe, oxides of alkali metals or of alkaline-earth metals of the type Ca, Na, K, Li, in particular the potassium or sodium oxides.

This mineral material may for example be oxides of alkali metals or of alkaline-earth metals of the type Ca, Na, K, Li or else impurities (associated in particular with the raw materials used) such as $Al_2O_3$, in an amount below 1.5%, or below 1.0%, or below 0.8%, or even below 0.5% of the total mineral mass.

The method may comprise an additional step (before or after step a)) of grinding or deagglomeration of the raw materials used in such a way that they have a median diameter suitable for the method and the application, preferably below 1 micrometer, or below 0.5 micrometer, or even between 0.2 and 0.5 micrometer.

In step b), forming is preferably done by extrusion, for example in the form of tubing or in the form of a honeycomb as indicated in the rest of the description.

In principle, during said forming, the mixture from step a) does not comprise additional organic products, sintering being carried out immediately after the forming step, without intermediate thermal treatment.

In step b), forming may alternatively be done by compacting. In particular, forming may be carried out by pressing. In said forming, the mixture from step a) comprises one or more organic product(s) preferably mixed with a solvent such as water, in which, during a step c), the thermal treatment under air or an oxidizing atmosphere is carried out at a temperature sufficient to allow removal of a high proportion of the organic product or products and below the evaporation temperature of the reducing agent.

In step b), forming may also consist of granulation, for example using an intensive mixer or a suspension atomizer or fluidized-bed atomizer.

In step b), forming may also consist of any other forming technique, for example using a suspension, for example tape casting or dip coating.

In the optional step c), the temperature is preferably above 150° C., or above 170° C., or even above 200° C. and/or below 480° C., or below 450° C., or even below 430° C.

In step d), the temperature is preferably above 1180° C., or above 1200° C., or even above 1230° C. and/or below 1400° C., or below 1380° C., or even below 1360° C.

In step d), the atmosphere is neutral, for example an argon atmosphere, or alternatively the atmosphere is reducing, for example an atmosphere under hydrogen partial pressure.

According to a particular embodiment of the invention, the mixture of raw materials comprises, by weight, at least 90% of titanium dioxide in the anatase form, and at least 3% of carbon black, the sintering temperature being adjusted between 1300 and 1450° C., preferably under a neutral atmosphere.

Employing this method, it was found possible to make porous products consisting essentially of titanium suboxides and corresponding to the general average formula $TiO_x$, the value of x being easily adaptable as a function of the composition of the initial mixture, in particular to values between 1.6 and 1.9 and more particularly between 1.75 and 1.85. Advantageously, such modulation may be obtained directly according to the invention as a function of the combined adjustment of the percentage of carbon black initially present in the mixture.

Furthermore, as stated above, the porous products resulting from the application of said method showed an appreciably improved porosity relative to the porous products obtained by other techniques. In particular, using the method according to the invention, it was possible to obtain products with a higher overall level of porosity, and whose pore distribution is approximately monomodal and the pore size is centered on a size of the order of a micrometer.

These properties make the use of the products according to the invention very advantageous in a great many fields of application and in particular for treating effluents.

The present invention thus also relates to porous products obtainable by a method according to the invention.

It also relates to porous products that are obtainable by a method according to the invention and are coated with a membrane.

In particular, the present invention relates to a porous product obtainable by a method as claimed in one of the preceding claims, characterized in that:

the material making up said product corresponds to the general formula $TiO_x$, the value of x being between 1.6 and 1.9, preferably between 1.75 and 1.85.

the distribution of the pore diameters is approximately monomodal, the median diameter $d_{50}$ of the pores is between 0.5 and 5 micrometers, in particular between 1 and 2.5 micrometers, the open porosity is above 34%.

The porous products according to the invention comprise more than 90 wt %, in total, of titanium suboxide(s) corresponding to the general formula $Ti_nO_{2n-1}$, n being an integer greater than or equal to 3 and less than or equal to 9.

All the porosity data described in the present description are measured by mercury porosimetry. Their total open porosity is greater than or equal to 34%.

The pore distribution of the titanium suboxide or suboxides making up the product according to the invention is monomodal. The median pore diameter, also measured by mercury porosimetry, is between 0.5 and 5 micrometers, preferably between 0.8 and 2.5 micrometers.

Preferably the porous products comprise in total more than 92%, or more than 94%, or even more than 95% of titanium suboxide(s).

While remaining within the scope of the present invention, the products may, however, comprise other phases, in particular silica ($SiO_2$), or else other elements, present essentially in the oxide form, or in the form of a defined compound (for example $KTi_8O_{16}$) or in solid solution with the titanium suboxide(s), in particular Al, Cr, Zr, Nb, Ta, Li, Fe, alkali metals or alkaline-earth metals of the type Ca, Sr, Na, K, Ba. Based on the corresponding simple oxides, the overall amount of said elements that are present is preferably below 10 wt % of the total weight of the product, for example below 5%, or below 4%, or even below 3 wt % of the total weight of the product. The presence of these elements may in particular be desired or may simply be associated with the impurities present in the raw materials used.

The products may additionally comprise traces of nitrides (titanium nitrides, oxynitrides or carbonitrides).

According to a preferred embodiment, the porous products according to the invention consist only of said titanium suboxides, the other phases only being present in the form of inevitable impurities.

In particular, said titanium suboxides are preferably mainly phases $Ti_nO_{2n-1}$ in which n is between 4 and 6, inclusive, i.e. $Ti_4O_7$, $Ti_5O_9$, $Ti_6O_{11}$, which have the best electron conductivities, said phases preferably representing, in total, more than 80%, or 85% or even 90% of the weight of the products according to the invention.

Said titanium suboxides preferably comprise $Ti_4O_7$ and/or $Ti_5O_9$ as the main phase.

"Mainly" means that the main diffraction peaks observed on an X-ray diffraction pattern correspond to these Magnéli phases.

In particular, in the sense of the present invention, a phase is regarded as "main" if it represents more than 25% of the weight of the product and preferably at least 35%, or even at least 45% of the weight of the product.

According to a particularly preferred embodiment, said main phases are $Ti_nO_{2n-1}$ phases of general formula $Ti_4O_7$ or $Ti_5O_9$ or $Ti_6O_{11}$ or a mixture of these phases.

In particular, in the porous products according to an advantageous embodiment of the present invention, the phases $Ti_4O_7$ and/or $Ti_5O_9$ and/or $Ti_6O_{11}$ represent, in total, more than 60% of the weight of the product, preferably more than 70% of the weight of the product, and very preferably more than 80% of the weight of the product, or even more than 90% of the weight of the product.

According to a particular form of a product according to the invention, the porous product according to the invention is a flat piece, for example of rectangular or circular shape, in particular obtained at the end of a step b) of compaction, or pressing or casting.

According to a particular form of a product according to the invention, the porous product according to the invention is a tube, in particular obtained at the end of a step b) of extrusion. In said tube, retention of the compounds to be treated and electrochemical degradation thereof may take place at the surface of the tube and/or in the pores. For carrying out the electrochemical reaction, the tube may be equipped with a cathode, for example of tubular shape, for example located coaxially inside a tube according to the invention.

According to a particular form of a product according to the invention, in particular obtained at the end of a step b) of extrusion, the porous product according to the invention is a honeycomb. Honeycomb means conventionally a structure comprising a plurality of channels approximately parallel to one another and separated from one another by walls, in particular porous walls made of titanium suboxide(s) according to the invention and of general formula TiOx, the value of x being between 1.6 and 1.9.

In a honeycomb, retention of the compounds to be treated and electrochemical degradation thereof may take place at the surface of the channels and/or in the pores of each channel. Retention may be of the "through-flow" type if the channels are alternatively blocked at one of their ends or else of the "tangential-flow" type if the channels are not blocked.

The honeycomb may be of rectangular, circular or ellipsoidal cross section. For carrying out the electrochemical reaction, the honeycomb may be equipped with a cathode to make up a module optionally combined with one or more other modules to form a larger system.

The respective percentages by weight of the various phases making up the product according to the invention can be determined by techniques that are well known in this field, in particular by X-ray diffraction, for example by simple comparison of the ratios of intensity between the diffraction peaks of the various phases present or more accurately by Rietveld analysis, according to the techniques that are well known in this field.

To avoid increasing the size of the present description unnecessarily, all the possible combinations according to the invention between the various preferred embodiments of the compositions of the products according to the invention, as have just been described above, are not presented. However, it goes without saying that all the possible combinations of the ranges and initial and/or preferred values described above are envisaged at the time of filing the present application and must be regarded as described by the applicant in the context of the present description (in particular of two, three or more combinations).

The invention and its advantages will be better understood on reading the nonlimiting examples given below. In the examples, all the percentages are given by weight.

EXAMPLES

In all the examples, the specimens were prepared from a homogeneous mixture obtained by mixing in a jar for 1 to 2 hours, mineral raw materials consisting of carbon black powder marketed by Cabot Corporation with median diameter of the grains of the order of 0.2 to 0.3 micrometers (verified by SEM analyses) and commercial titanium dioxide powder in the anatase form (designated A in the tables) and/or in the rutile form (designated R in the tables given below), both comprising more than 96% of $TiO_2$. The two powders have a median diameter of the order of 0.2 to 0.5 micrometers.

The powders of niobium or tantalum oxide used for examples 23 and 24 are of purity above 98% and were ground beforehand to obtain a median diameter of the grains of 0.3 micrometer.

The amount of carbon black (designated carbon in the tables), relative to 100 grams of titanium dioxide in the initial mixture, is given in the tables.

The mixtures of initial reactants may be formed by pressing (designated P in the tables), without adding other additives, in the form of a circular plate with diameter of 13 mm and height of 7 mm.

In other examples, additives are used consisting of the following organic products: a plasticizer (Methocel A4M, about 2.5 wt % of mineral mixture), a lubricant (Putroil, about 3.0 wt % of mineral mixture), a dispersant (Darvan C-N, about 1.5 wt % of mineral mixture), and water, and forming is then carried out by extrusion (designated E in the tables) in the form of tube with an inside diameter of the order of 6.2 mm and a thickness of about 4 mm and a length of the order of 162 mm after sintering.

In another example, forming is carried out by granulation (designated G in the tables): the initial reactants are mixed in a ball mill for 5 hours and are then passed through a granulator in countercurrent for 4 minutes with gradual addition of a solution of PVA (about 15 wt % of the mineral mixture) at the start of the operation.

When organic additives are used, the specimens are kept under air, for 30 minutes (unless stated otherwise in the tables), at the temperature $T_1$ given in the tables, to remove a high proportion of said organic products and, if applicable, volatile compounds of the reducing agent, by intermediate heating. Finally, they are sintered under an argon stream, in a Nabertherm RHTC 80-710/15 furnace with tube consisting of 99.7% of alumina, for 2 hours at the temperature $T_2$ given in the tables.

The experimental protocols employed for characterization of the composition and properties of the various specimens obtained are as follows:

1) The crystalline phases present in the refractory products were characterized by X-ray diffraction. The results obtained are presented in the tables. In these tables, PP indicates the main phase or phases, PM indicates the minor phase or phases. In the sense of the present invention, a phase is regarded as "main" when it represents at least 25% of the total weight of the product. A phase is regarded as "minor" when it represents more than 5% but less than 25% of the weight of the product, in particular more than 5% but less than 20% of the weight of the product and preferably more than 5% but less than 15% of the weight of the product, it being understood that the sum total of the weight of the minor phases is normally below 50% and is preferably below 30%, or even below 20%, of the weight of the product.

2) The porosities and the median diameter are determined in a known manner by mercury porosimetry. The pore volume is measured by mercury intrusion at 2000 bar using an Autopore IV mercury porosimeter, series 9520 Micromeritics, on a 1 cm³ specimen. The applicable standard is ISO15901-1:2016 part 1. Increasing the pressure to high pressure "pushes" the mercury into smaller and smaller pores. The median pore diameter (designated $D_{50}$ in the tables) corresponds to a threshold of 50% of the population by volume. "Mono" in the tables signifies that the pore distribution is monomodal and centered on D50, which is also shown.

3) The residual carbon is determined by infrared absorption using a Horiba analyzer in which the specimen, in the form of powder, undergoes combustion in a stream of oxygen of high purity.

4) The equipment used for measuring the median diameter of the grains of titanium oxide incorporated in the initial mixture is a granulometer of model LA-950V2 from the company HORIBA, with a refractive index of 2.61.

TABLE 1

| Example | 1* | 2 | 3 | 4 | 5 | 6 | 7 | 8* | 9* |
|---|---|---|---|---|---|---|---|---|---|
| $TiO_2$ | A | A | A | A | A | A | A | R | R |
| Carbon (g) | 1.0 | 2.0 | 2.5 | 3.0 | 3.7 | 3.7 | 3.4 | 3.4 | 4.0 |
| Forming | P | P | P | P | P | P | P | P | P |
| T1 (° C.) | — | — | — | — | — | — | — | — | — |
| T2 (° C.) | 1450 | 1300 | 1300 | 1300 | 1300 | 1400 | 1400 | 1400 | 1450 |

TABLE 1-continued

| Example | | 1* | 2 | 3 | 4 | 5 | 6 | 7 | 8* | 9* |
|---|---|---|---|---|---|---|---|---|---|---|
| Phases | PP | | $Ti_8O_{15}$ | $Ti_6O_{11}$ | $Ti_5O_9$ | $Ti_5O_9$ $Ti_4O_7$ | $Ti_5O_9$ $Ti_4O_7$ | $Ti_5O_9$ $Ti_4O_7$ | | |
| | PM | | $Ti_9O_{17}$ $Ti_7O_{13}$ | $Ti_7O_{13}$ | $Ti_6O_{11}$ | | | | | |
| Porosity (%) | | 14 | 35 | 38 | 38 | 38 | 34 | 34 | 10 | 13 |
| $D_{50}$ (μm) | | | | | | 1.8 | 1.8 | 1.8 | | |
| Distribution of pore diameters | | | | | | Mono | Mono | Mono | | |

*comparative

Examples 1, 8 and 9 in Table 1 are comparative examples:

According to example 1, the level of carbon is insufficient to obtain the Magnéli phases required.

According to examples 8 and 9, the source of titanium dioxide is powdered rutile.

TABLE 2

| Example | | 10 | 11 | 12 | 13 | 14* | 15* |
|---|---|---|---|---|---|---|---|
| $TiO_2$ | | A | A | A | A | A | A |
| Carbon (g) | | 3.4 | 3.4 | 3.4 | 3.4 | 3.4 | 3.4 |
| Forming | | E | E | E | E | E | E |
| T1 (° C.) | | 350 | 350 | 350 | 350 (2 h) | 350 | 500 |
| T2 (° C.) | | 1300 | 1350 | 1400 | 1400 | 1450 | 1350 |
| Phases | PP | $Ti_5O_9$ $Ti_4O_7$ | $Ti_5O_9$ $Ti_4O_7$ | $Ti_5O_9$ $Ti_4O_7$ | $Ti_5O_9$ $Ti_4O_7$ | $Ti_5O_9$ $Ti_4O_7$ | $TiO_2$ |
| | PM | | | | | $Ti_3O_5$ $Ti_6O_{11}$ | |
| Porosity (%) | | 42 | 39 | 34 | 36 | 29 | 10 |
| D50 (μm) | | 1.7 | 1.8 | 1.8 | 1.9 | 2.2 | |
| Distribution of pore diameters | | Mono | Mono | Mono | Mono | Mono | |

*comparative

Examples 14 and 15 are comparative examples:

According to example 14, the temperature of the thermal treatment for sintering is too high.

According to example 15, the temperature of the thermal treatment for removing the organic compounds is too high, leading to removal of some of the reducing agent.

The curves obtained for the distribution of pore diameters of the products as well as the electron micrographs according to examples 7, 10 and 11 according to the invention are presented in the appended FIG. 1. It can be seen that there is monomodal distribution of pore diameters, centered on a value of the pore diameter of the order of a micrometer.

TABLE 3

| Example | 16 | 17 | 18 | 19* |
|---|---|---|---|---|
| $TiO_2$ | A (70%) + R (30%) | A (60%) + R (40%) | A (60%) + R (40%) | A (50%) + R (50%) |
| Carbon (g) | 3.4 | 3.4 | 3.4 | 3.4 |
| Forming | P | P | P | P |
| T1 (° C.) | — | — | — | — |
| T2 (° C.) | 1200 | 1200 | 1300 | 1300 |
| Porosity (%) | 40 | 38 | 34 | 28 |

*comparative

Example 19 is a comparative example: the proportion of rutile is too high.

TABLE 4

| Example | | 20* | 21 | 22 |
|---|---|---|---|---|
| $TiO_2$ | | A | A | A |
| Carbon (g) | | 3.4 | 3.4 | 3.4 |
| Forming | | P | P | P |
| T1 (° C.) | | — | — | — |
| T2 (° C.) | | 1100 | 1200 | 1300 |
| Phases | PP | ND | $Ti_6O_{11}$ | $Ti_6O_{11}$ $Ti_5O_9$ |
| | PM | | $Ti_7O_{13}$ $Ti_5O_9$ $Ti_4O_7$ $Ti_3O_5$ | $Ti_4O_7$ $Ti_3O_5$ |
| C residual (%) | | 1.4 | 0.6 | 0.3 |

*comparative

Example 20 is a comparative example: the sintering temperature is too low, resulting in the presence of residual carbon, which could be harmful for the electrochemical reactions.

In the next examples 23 and 24 (Table 5), a small proportion of an oxide $Nb_2O_5$ or $Ta_2O_5$ was added to $TiO_2$ in the anatase form. In both cases we observe an appreciable increase in final porosity compared to examples 4 and 5 in particular.

TABLE 5

| Example | | 23 | 24 | 25 | 26 |
|---|---|---|---|---|---|
| $TiO_2$ | | A | A | A | A |
| Oxide | | $Nb_2O_5$ 2.2% | $Ta_2O_5$ 1.3% | | |
| Carbon (g) | | 3.4 | 3.4 | 3.7 | 3.7 |
| Forming | | P | P | E | G |
| T1 (° C.) | | — | — | 350 (2 h) | 110 (60 h) |
| T2 (° C.) | | 1300 | 1300 | 1300 | 1300 |
| Phases | PP | $Ti_5O_9$ $Ti_4O_7$ | $Ti_5O_9$ $Ti_4O_7$ | $Ti_4O_7$ $Ti_5O_9$ | $Ti_4O_7$ |
| | PM | | | | $Ti_5O_9$ $Ti_3O_5$ |
| Porosity (%) | | 54 | 54 | 43 | |
| $D_{50}$ (μm) | | 1.4 | 1.8 | 1.7 | 1.3 |
| Distribution of pore diameters | | Mono | Mono | Mono | Mono |

Rietveld analysis of the X-ray diffraction patterns shows that the product from example 25 comprises 80 wt % of $Ti_4O_7$ and 20 wt % of $Ti_5O_9$.

Analysis of the data presented in the tables shows that:

It is necessary to use the anatase form of titanium dioxide as the source of titanium dioxide, at least for a proportion above 55 wt %, as the use of a rutile phase does not give the desired porosities of the material making up the product according to the invention;

the necessary amount of reducing agent must be adjusted to obtain the desired Magnéli phases;

in the presence of organic products, the thermal treatment under air or an oxidizing atmosphere must take place at a temperature below the evaporation temperature of the reducing agent of the titanium oxide, for example below 450° C. when the reducing agent is carbon black;

the products obtained by a method according to the invention have a porosity greater than or equal to 34%, the pore distribution is monomodal and of the order of a micrometer.

Together, these porosimetric characteristics lead to better treatment of liquids and higher filtration efficiency, since the product according to the invention is thus characterized by a larger number of pores, all having a median size of the order of a micrometer, for an identical pore volume and/or increased pore volume, as well as limitation of the head loss. Alternatively, these properties lead to enhanced selectivity in retention and easier removal of polluting species of small size, of the order of a micrometer.

The invention claimed is:

1. A method of manufacturing a porous product consisting essentially of titanium suboxide(s) of general formula $TiO_x$, the value of x being between 1.6 and 1.9, said method comprising:
   a) mixing raw materials comprising at least one source of titanium dioxide, a reducing agent comprising carbon and optionally one or more organic products,
   b) forming the product,
   c) optionally, performing a thermal treatment under air or an oxidizing atmosphere at a temperature sufficient to allow removal of a high proportion of the one or more organic products and below the evaporation temperature of the reducing agent,
   d) sintering at a temperature above 1150° C. but not exceeding 1430° C., under a neutral or reducing atmosphere,
   in which the source of titanium dioxide consists of at least 55 wt % of anatase,
   wherein
      a distribution of pore diameters in the porous product is approximately monomodal,
      the median diameter $d_{50}$ of the pores of the porous product is between 0.5 and 5 micrometers,
      the open porosity of the porous product is above 34%, and
      the porous product comprises more than 90 wt %, in total, of Magnéli phases selected from $Ti_4O_7$, $Ti_5O_9$, $Ti_6O_{11}$ or a mixture of at least two of these phases.

2. The method of manufacture as claimed in claim 1, in which the amount of reducing agent is adjusted in such a way that the porous product corresponds to the general formula TiOx, the value of x being between 1.6 and 1.9.

3. The method as claimed in claim 1, in which the initial mixture comprises more than 90 wt % of anatase as the source of titanium dioxide.

4. The method as claimed in claim 1, in which the reducing agent comprising carbon is selected from carbon black, cokes or any other organic compound comprising at least 50 wt % of carbon, or at least 70 wt % or even 80 wt % of carbon.

5. The method as claimed in claim 1, in which the reducing agent is carbon black.

6. The method as claimed in claim 1, in which the initial mixture comprises between 1.5 and 5.0 wt % of carbon, relative to the total weight of titanium dioxide.

7. The method as claimed in claim 1, in which step d) is performed under a neutral atmosphere.

8. The method as claimed in claim 1, in which step d) is performed under a reducing atmosphere.

9. The method as claimed in claim 1, in which the mixture of raw materials comprises, by weight, at least 90% of titanium dioxide in the anatase form, and at least 3% of carbon black, and in which the sintering temperature is adjusted between 1300 and 1450° C.

10. The method as claimed in claim 1, in which the porous product consists essentially of Magnéli phases selected from $Ti_4O_7$ and/or $Ti_5O_9$.

11. The method as claimed in claim 1, in which the initial mixture of raw materials comprises mineral material other than titanium dioxide, in an amount below 5.0% of the total mineral mass.

12. The method as claimed in claim 1, in which the initial mixture of raw materials comprises mineral material other than titanium dioxide, said mineral material being selected from the group consisting of silica $SiO_2$, the oxides $Nb_2O_5$ or $Ta_2O_5$, $V_2O_5$, $ZrO_2$ or the oxides of Ba, Sr, Mn, Cr, Fe, the oxides of alkali metals or of alkaline-earth metals.

13. The method as claimed in claim 1, wherein the one or more organic products are mixed with a solvent such as water.

14. The method as claimed in claim 13, wherein the solvent is a water.

15. The method as claimed in claim 1, wherein step c) is performed when the one or more organic products are used during step a).

16. The method of manufacture as claimed in claim 2, in which the value of x being between 1.75 and 1.85.

17. The method as claimed in claim 9, in which the sintering is done under a neutral atmosphere.

18. A porous product, wherein:
   the material making up said product corresponds to the general formula $TiO_x$, the value of x being between 1.6 and 1.9,
   the distribution of pore diameters is approximately monomodal,
   the median diameter $d_{50}$ of the pores is between 0.5 and 5 micrometers,
   the open porosity is above 34%, and
   the porous product comprises more than 90 wt %, in total, of Magnéli phases selected from $Ti_4O_7$, $Ti_5O_9$, $Ti_6O_{11}$ or a mixture of at least two of these phases.

19. The porous product as claimed in claim 18, in which the median diameter $d_{50}$ of the pores is between 1 and 2.5 micrometers.

20. The porous product as claimed in claim 18, further comprising, in said porous product, a mineral material other than $TiO_x$, in an amount below 5.0% of the total mineral mass, said additional mineral material being selected from silica $SiO_2$, the oxides $Nb_2O_5$ or $Ta_2O_5$, $V_2O_5$, $ZrO_2$ or the oxides of Ba, Sr, Mn, Cr, Fe, the oxides of alkali metals or of alkaline-earth metals.

* * * * *